INVENTORS
LAWRENCE A. CLARK
JAMES L. WENZEL
BY *D. David Blumenfeld*
ATTORNEY

United States Patent Office 3,620,046
Patented Nov. 16, 1971

3,620,046
GENERATOR SHAFT DISCONNECT
James L. Wenzel, Northeast, and Lawrence Arthur Clark, Erie, Pa., assignors to General Electric Company
Filed July 2, 1970, Ser. No. 51,981
Int. Cl. F16d 3/00
U.S. Cl. 64—28
6 Claims

ABSTRACT OF THE DISCLOSURE

A non-resettable disconnect arrangement is described which is particularly useful for disconnecting high speed generators such as those utilized in aircraft electrical systems. A splined, disconnect coupling member is disposed between the driving and driven shafts. The shaft of the coupling contains at least one reduced diameter shear section which ruptures to disconnect the driving and driven shafts. A conical friction disc is mounted on the shaft of the disconnect coupling. An externally controlled friction ring having a corresponding inner conical surface is brought into contact with the disc during disconnect and the torque exerted on the shaft when the disc and ring engage ruptures the shear sections and disconnects the generator.

---

Figure 1:
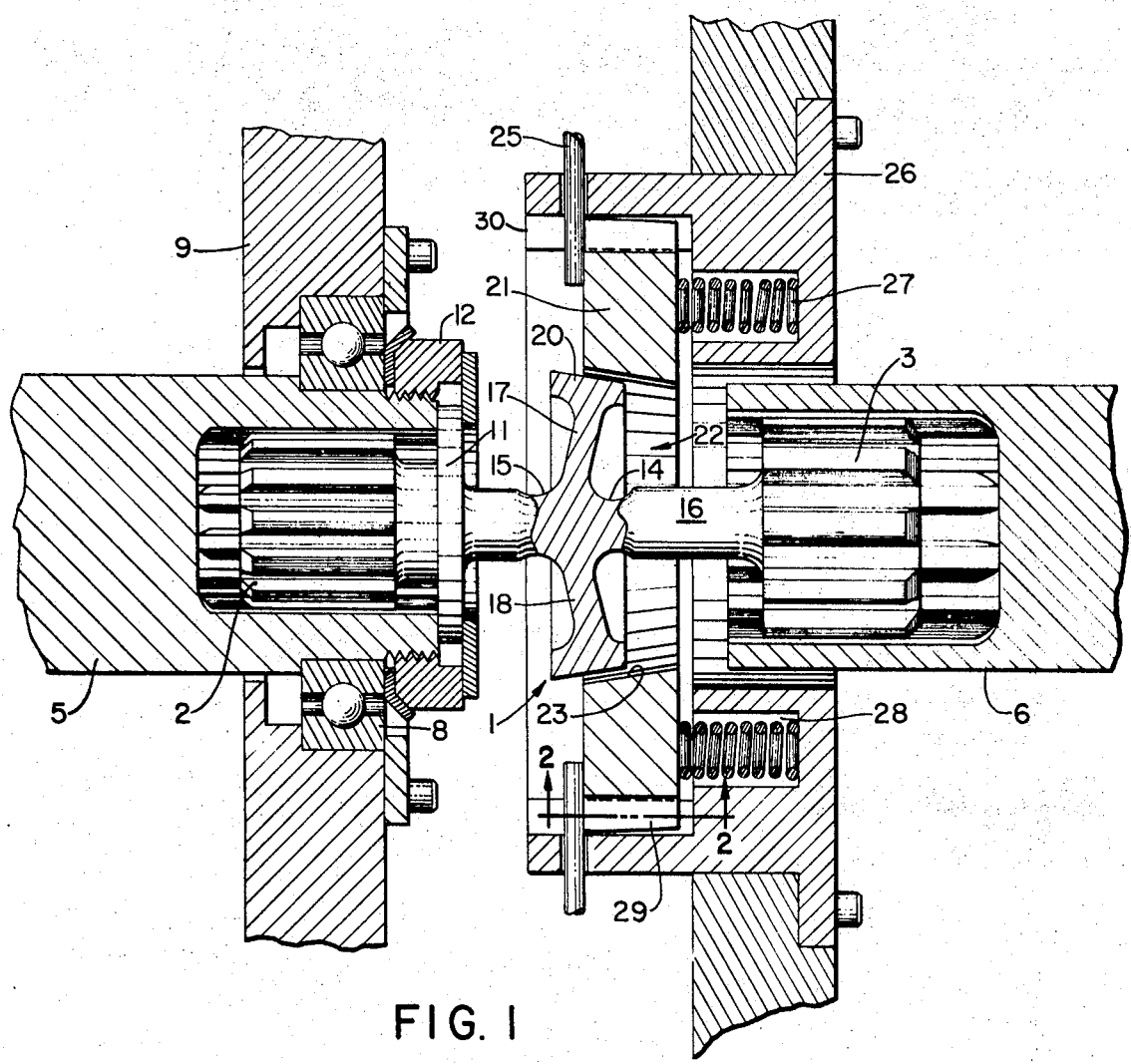

This invention relates to a disconnect device, and more particularly, to a device for disconnecting a driven device such as a generator from the driving source.

In aircraft applications, the electrical system for supplying the electrical needs of the vehicle customarily incorporates one or more generators which are either driven directly from the engine or through a speed reducing gear box. The generators are customarily operated at high speeds often in excess of 10,000 r.p.m. Occasionally, one or more of the generators must be disconnected from the driving source lest serious damage be done to the generator and the electrical system because of some malfunction has occurred or is about to occur. Thus, for example, the generator must be disconnected from the driving source if there is an actual or incipient bearing failure, excessive vibration, engine overspeed, excessive oil temperatures, etc. Whenever any of these or other malfunctions occur in the vehicle, rapid disconnect of the generator from the driving source is required in order to avoid serious damage to the equipment and the system. Usually, sensors of various types are strategically distributed throughout the craft to sense the occurrence or incipient occurrence of these various conditions. The sensors generate a signal which usually produces an indication, such as the lighting of a warning light, or the like, on the pilot's instrument panel. Whenever such a warning device is energized to indicate the malfunction, or incipient malfunction, the pilot then actuates a disconnect mechanism which removes the generator from the driving source.

Hitherto, two basic types of disconnect devices have been available; devices which can be classified generally as resettable and non-resettable. The resettable devices are of the type in which the generator could be reconnected to the driving source without in any way disassembling, or replacing components of the coupling between the driving source and the generator. The non-resettable disconnects, on the other hand, usually involve the rupturing, shearing, or fracturing of a connection between the driving source and the generator and therefore, require disassembly and replacement of certain components before the generator can be placed on line again. Both types of disconnect devices, while useful in many circumstances and environments, are subject to a number of failings which limit their utility. The resettable devices tend to be complex and bulky. Furthermore, they require a substantial number of interacting components so that the reliability of the devices is less than might be desired. The non-resettable disconnects, on the other hand, while simple in construction, also have some shortcomings. Thus, one typical such non-resettable device involves the use of a cam and a spring restrained dog. The dog is released when the disconnect function is to be performed, engaging the cam and restraining. The torque thus exerted on the shaft causes it to shear. Serious difficulties can arise in disconnects of this type when operating at high speeds; i.e. in the order of 10 to 20,000 r.p.m. or more. At these rotational speeds, the kinetic energy of the rotating members is quite substantial. In order to absorb the kinetic energy without fracturing the dog or cam, (which would prevent disconnect since the fracture of these components will prevent shearing of the shaft), the kinetic energy has to be absorbed through deflection of the rotating parts. At these speeds and with these kinetic energies, the required deflection can, in many instances, be excessive and raise significant problems. Furthermore, the problem of ensuring proper engagement between the dog and the cam can be quite severe and requires synchronization between the members to provide proper engagement. That is, at 20,000 r.p.m., the cam rotates once every .003 second. In order to provide proper operation, the dog must be properly indexed so that it does not begin to move until the cam is in a specific angular position. Otherwise, proper engagement will not take the place. Consequently, proper indexing or synchronizing between movement of the cam and the dog is necessary and adds a certain amount of complexity to the arrangement. Consequently, a need exists for a simple, light weight and effective, non-resettable disconnect mechanism which is capable of operating at high speeds and in which the kinetic energy is dissipated or absorbed other than by deflection of the parts and in which the disconnect function can be performed at any regular position of the shaft.

It is therefore a primary objective of this invention to provide a non-resettable shaft disconnect arrangement which is simple in construction, light in weight and which operates efficiently and effectively at high rotational speeds.

Another objective of the invention is to provide non-resettable shaft disconnect arangement operable at high speeds in which the disconnect is operated and the kinetic energy is at least partially dissipated in the form of heat.

Other objectives and advantages of the invention will become apparent as the description thereof proceeds.

The various advantages and objectives of the invention may be carried out by providing a non-resettable, disconnect mechanism in which a disconnect coupling member is provided between the driving and driven member and contains a section designed to shear at a predetermined over torque. The shearing torque for disconnect is applied by means of a conical friction disc and a friction ring having an inner surface which conforms to the friction disc. The friction ring is normally maintained out of contact with the disc and therefore forms no part of the rotating mass under normal operation. When the generator is to be disconnected, the friction ring is released and driven through the medium of a compression spring into contact with the friction disc. When the disc and ring come into engagement, the friction at their interface results in torque which drives the ring further into contact with the disc. When the frictional torque on the disc exceeds the breaking torque of the shear section, the shaft ruptures releasing the generator from the driving source. In this fashion, the generator is positively and effectively disconnected from the driving source whenever the latching mechanism is actuated.

Figure 2:
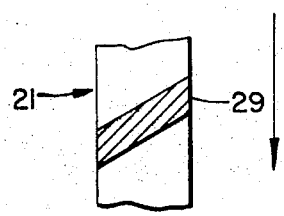

The novel features, which are believed to be characteristic of this invention, are set forth with particularity in the appended claims. The invention itself, however, both as to its organization and method of operation, together with further objects and advantages thereof, may be best understood by reference to the following description taken in connection with the accompanying drawings in which:

FIG. 1 is a vertical section taken through a disconnect device constructed in accordance with this invention, FIG. 2 is a section taken on a plane indicated by the line 2—2 in FIG. 1.

As shown in FIG. 1, the disconnect device 1 includes a shaft 2 having splined end portions 3 and 4 which engage internally splined portions of the driven and driving shaft members 5 and 6 respectively. The driven shaft member 5 which may be attached to the rotor of a generator, not shown, is journaled in bearings 8 supported on the generator housing 9, shown partially broken away. The driving shaft 6 may be connected either directly to the engine of the aircraft or to a gearbox coupled to the engine. The coupling member thus transmits power from the driving shaft 6 to the driven shaft 5 and drives the generator at a predetermined speed, which in aircraft electrical systems may range from 10,000 r.p.m. up. A shoulder 11 on the coupling member abuts against the end of shaft 5 and is retained firmly in position by means of a locknut 12 threaded on the end of the shaft. Locknut 12 also abuts against bearings 8 in which the shaft is journaled and thus constrains the driving generator bearings 8 as well as preventing or limiting axial movement of the shaft.

Two reduced diameter shear sections 14 and 15 on shaft 16 are positioned on either side of a conical friction disc 17 secured to shaft 2 by means of the spider 18. Frtcion disc 17 has an outer surface 20 formed in the shape of a cone, with the cone angle increasing from the driven side to the generator side. When the conical surface of disc 17 comes into contact with friction ring 21 sufficient torque is exerted on the shaft of the coupling member to exceed the breaking torque of shear section 15 on the driving side of the coupling, shearing the shaft and releasing the generator from the engine. Subsequently, the remaining shear section 14 absorbs the inertia of the generator rotor and shears to disconnect the generator from the disc. Although two shear sections 15 and 14 are shown in FIG. 1, the invention is not limited to such an arrangement. Only one shear section is necessary, the section adjacent to the driven end which is ruptured to disconnect the generator from the drive shaft. The remaining shear section may be eliminated and the inertia of the rotor absorbed in the friction between the conical surface of the friction disc and the friction ring. However, where two shear sections are provided, the size of shear section 15 must be such that it shears before section 14 so that the generator is properly disconnected from the drive shaft.

Friction ring 21 which is selectively actuated to engage disc 17 and apply the necessary torque to the coupling shaft has an opening 22 having a generally conical internal surface 23 which conforms generally to the cone shaped outer surface of friction disc 17. The dimension of opening 22 and surface 23 are such that axial movement of the ring towards the driven member, namely from right to left as illustrated in FIG. 1, brings the ring into frictional contact with the disc to exert torque on the shaft of the coupling member to produce the desired shearing at the shear sections. Ring 21 is normally maintained out of contact with the friction disc by a latch mechanism such as latch pin 25 which extends through friction ring housing 26 and bears against one side of ring 21. A compression coil spring 27 mounted in a counter bore 28 in housing 26 bears against the other side and spring biases the ring against latch pin 25 to produce axial movement of the ring towards the generator whenever latch pin 25 is disengaged. Latch pin 25 may be controlled by any suitable actuating means, not shown, such as a solenoid, manual release or the like to release friction ring 21. Removal of the latch pin, as pointed out above, produces axial movement of the ring to engage the friction discs 17 to initiate the disconnect sequence. A plurality of angled keys 29 (which may be most readily seen in FIG. 2) are positioned around the circumference of the ring and mate with a plurality of angled slots or keyways 30 in housing 26. The angled keys and keyways are provided to cause additional axial movement of the friction ring to provide more positive engagement of the ring with the friction disc once the latch pin 25 is released. This is, once the two elements are brought into contact action of the compression coil spring 27, the force transmitted to the housing by the angled keys on the ring results in an axial force on the friction ring which tends to move it axially towards the driven member, and increases the contact and frictional pressure at the interface of the ring and the disc. This insures firm and positive engagement between the two members once the disconnect mechanism is actuated to provide rapid and effective disconnect of the generator from the driving source by making certain that sufficient torque is exerted on the shaft to produce shearing at the shear section.

In operation, the friction ring 21 which actuates operation of the disconnect sequence is normally out of contact with friction disc 17 of disconnect coupling 1. The ring is maintained in this position by means of latch pin 25 extending through housing 26. Whenever an actual or incipient malfunction occurs which requires disconnecting of the generator, one of the sensors produces an indication at the pilot's instrument panel. The pilot then actuates the disconnect mechanism, either manually, or preferably by actuating a solenoid relay which moves latch pin 25 upwards and out of contact with friction ring 21. Compression coil spring 27 forces friction ring 21 against conical surface 20 of the friction disc. The force exerted on the friction ring is transmitted to housing 26 by the angled keys 29 and 30. The force exerted on these angled keys results in an axial force on the friction ring which increases the pressure at the interfaces. Thermal expansion of these parts due to the dissipation of heat at their surface, also tends to increase the pressure. When the torque on disc 17 exceeds the breaking torque of shear section 15, the shaft is sheared, removing the generator from the engine. The inertia of the generator rotor, which is still spinning at a substantial speed is then either absorbed by friction (if the coupling does not contain an additional shear section such as the one illusrated at 14) or by shearing the second section 14. Once the generator is disconnected, it remains in this condition until disassembled and until a new coupling is provided. It will be obvious, that all that is required to place the system in operating condition again is to remove the now separated splined ends from the drive and driving shaft and to reassemble the entire arrangement by furnishing a new disconnect coupling.

The non-resettable disconnect coupling described above has been described in terms of a manual or operator controlled sequence of operation. It will be obvious, that the invention is not so limited since an automatic arrangement could equally well be provided in which the sensing element directly controls a solenoid to remove the latching pin without the intervention of a human operator.

From the foregoing description, it can be readily appreciated that non-resettable, disconnect mechanism for a generator, and aparticularly for an aircraft generator has been provided which is capable of disconnecting the generator from the driving source rapidly, and efficiently at the high speeds which chaacterize aircraft generators.

While a non-resettable disconnect mechanism has been described, in what is presently considered to be a preferred embodiment of the invention, it will be apparent to those skilled in the art that various changes and modifications may be made in the structure and in the instrumentalities utilized without departing from the spirit and scope of the invention.

What we claim is new and desired to be secured by Letters Patent in the United States is:

1. A non-resettable disconnect device adapted to connect releasably, a driving and a driven member comprising,
   (a) a shaft having splined ends, adapted to be connected respectively to a driven and a driving member,
   (b) a reduced diameter shear section means located on said shaft to sever said shaft and disconnect said driving and driven members whenever the torque exerted on said shaft exceeds a predetermined magnitude,
   (c) means for selectively applying sufficient torque to sever said shaft including,
      (1) disc means mounted on said shaft and coaxial therewith,
      (2) a housing,
      (3) ring means carried by said housing and having an opening therein adapted to engage the outer surface of said disc to apply torque to said shaft to shear it, said ring means being restrained from rotating,
      (4) latching means to hold said ring out of contact with said disc,
      (5) means to release said latching means to move said ring axially into contact with the outer surface of said disc to apply torque to said shaft and cause shearing at said shear section means to disconnect the driving and driven members.

2. The disconnect device according to claim 1 wherein the outer surface of said disc is cone shaped.

3. The disconnect device according to claim 1 wherein said ring is spring biased to move said ring axially into contact with sad disc.

4. The disconnect device according to claim 3 wherein said housing and said ring contain angled keyways whereby the rotational force exerted by said disc on said ring upon contact therebetween produces further axial movement of said ring to maintain firm contact therebetween.

5. The disconnect device according to claim 1 wherein said shear section means comprises two shear sections on the driving and driven sides of said disc.

6. The disconnecte device according to claim 5 wherein the shear section adjacent the driving side of said disc is of a dimension such that it ruptures first.

References Cited

UNITED STATES PATENTS

| | | | |
|---|---|---|---|
| 2,862,375 | 12/1958 | Miller | 64—28 |
| 3,200,616 | 8/1965 | Hawkins | 64—28 |

EDWARD G. FAVORS, Primary Examiner